United States Patent [19]

Plummer, Jr.

[11] Patent Number: 4,741,087

[45] Date of Patent: May 3, 1988

[54] METHOD OF MAKING PRE-EXPANDED BRAIDED SLEEVING

[76] Inventor: Walter A. Plummer, Jr., 3546 Crownridge Dr., Sherman Oaks, Calif. 91403

[21] Appl. No.: 817,868

[22] Filed: Jan. 13, 1986

Related U.S. Application Data

[62] Division of Ser. No. 532,707, Sep. 16, 1983, abandoned.

[51] Int. Cl.⁴ .............................................. D03D 3/02
[52] U.S. Cl. ........................................ 29/446; 28/142; 87/6; 87/7; 138/123
[58] Field of Search ............................... 87/5–9, 87/11, 13, 28–30; 28/142, 143; 139/387; 138/123; 174/DIG. 8; 29/446

[56] References Cited

U.S. PATENT DOCUMENTS

| | | | |
|---|---|---|---|
| 2,041,950 | 5/1936 | Pierce | 87/7 |
| 2,114,274 | 4/1938 | Huppert | 87/2 |
| 2,257,649 | 9/1941 | Pierce | 87/7 |
| 2,286,136 | 6/1942 | Johnson | 87/7 |
| 3,081,368 | 3/1963 | Wunsche | 87/7 |
| 3,669,157 | 6/1972 | Woodal et al. | 28/142 |
| 3,953,640 | 4/1976 | Takada | 280/733 |
| 4,271,329 | 6/1981 | Perelmutter | 174/DIG. 8 |
| 4,326,905 | 4/1982 | Tanaka | 87/9 |

FOREIGN PATENT DOCUMENTS

| | | | |
|---|---|---|---|
| 52-25290 | 2/1977 | Japan | 87/9 |
| 52-56393 | 5/1977 | Japan | 87/9 |
| 863837 | 3/1961 | United Kingdom | 87/9 |

Primary Examiner—Howard N. Goldberg
Assistant Examiner—Irene Cuda
Attorney, Agent, or Firm—Christie, Parker & Hale

[57] ABSTRACT

Disclosed is a method of making pre-expanded braided sleeving from flexible strands of either conductive or nonconductive filaments, or a combination thereof, along with entrapped warp filaments of heat shrinkable material. The warp filament material is commonly known as heat reactive material and, when briefly subjected to heat below its fusion temperature, shrinks in the order of 30% to 50% of its length and very substantially expands the sleeving thereby greatly expediting the assembly thereof over an elongated object. Thereafter the sleeving is readily contracted into a snug fit with the object upon being tensioned between its opposite ends.

8 Claims, 2 Drawing Sheets

METHOD OF MAKING PRE-EXPANDED BRAIDED SLEEVING

This application is a division of my copending application for U.S. patent Ser. No. 06/532,707 filed Sept. 16, 1983 entitled Pre-expanded Braided Sleeving now abandoned.

This invention relates to braided sleeving and more particularly to a unique method of making a pre-expanded braided sleeving and to the product produced thereby.

BACKGROUND OF THE INVENTION

Braided tape and sleeving has long been manufactured by well known equipment in an endless variety of forms suitable for a multitude of applications. One of the particularly large volume uses for such sleeving is as an appearance and/or protective jacketing for elongated objects including but not limited to conductors, cabling, cordage, rope and as protection for delicate and finished surfaces of articles of manufacture generally during handling and shipping. Such sleeving may be made of filaments of various materials including conductive and nonconductive material, plastics, metals and textiles.

Irrespective of the constituent material and of the particular application or use, users of such sleeving have been confronted with frustrating and unresolved problems attending the assembly of the sleeving over the object to be embraced. This is due to the fact that the sleeving as manufactured, and whether in tape or tubular configuration, is elongated and circumferentially contracted. The assembly of conventional sleeving requires that the user endeavor to hold the advance end of the sleeving axially contracted while at the same time endeavoring to advance the leading end over the object being enshrouded. Any relaxation of the forces tending to contract the tubing allows it to collapse and grip the object. In consequence, the assembly of the sleeving is time and labor intensive as well as vexatious and frustrating.

The only relevant prior braided sleeving known to me having entrapped warp filaments is disclosed in U.S. Pat. No. 2,114,274 Huppert and concerns a hairdressing accessory in the form of a foundation or curler for dressing hair. The sleeving there proposed has a braided main body woven about a plurality of elastic filaments maintained under tension during the braiding process. Thereafter the elastic tension stored in the elastomeric filaments acts to hold the sleeving resiliently expanded as a foundation for use in hairdressing operations. In use, the warp filaments of Huppert maintain the sleeving expanded and against contraction girthwise and axially. These permanently present structural and functional characteristics are essential to its intended mode of use.

SUMMARY OF THE INVENTION

The present invention overcomes the disadvantages and shortcomings of prior art braided sleeve constructions. This is achieved by interweaving low strength filaments of heat reactive warp filaments between overlapping strands of the braided sleeving as the sleeving is manufactured by conventional braiding equipment. The heat reactive warp filaments are entrapped between braiding strands in a normal substantially untensioned condition. Thereafter the braided sleeving is subjected to brief heating at a temperature below the fusion temperature of the warp filaments and adequate to shrink the same thereby contracting the sleeve axially while expanding it circumferentially to a diameter very substantially larger than the product as produced by the braiding machine. Preferably and advantageously, the advance end of the sleeving entering the heating zone is clamped to prevent partial withdrawal of the warp filaments as they undergo shrinkage.

If stiffer filaments of either conductive or nonconductive material are used for the braided strands, it has been found advantageous in some instances to employ a small percentage of strands formed from plastic material. Thus it appears that the lubricity of these softer and less rigid strands facilitates the axial contraction and circumferential expansion of the sleeving during heating and shrinkage of the warp filaments. As the warp filaments shrink the sleeving expands and resists but permits flattening which may occur during handling, coiling or packaging of the finished product. However, upon release of the flattening pressure the sleeving promptly substantially recovers its previous expanded condition so long as the warp filaments remain intact.

Accordingly, it is a primary object of this invention to provide a new method of making expanded braided sleeving and the product provided thereby.

Another object of the invention is the provision of unique pre-expanded braided sleeving incorporating one or more warp filaments of heat reactive material trapped between interwoven braid strands, the warp filaments being effective upon exposure to heat to contract the sleeving axially while expanding it circumferentially.

Another object of the invention is the provision of unique sleeving formed from interwoven helical strands of either conductive or nonconductive flexible filaments in association with warp filaments of heat reactive material trapped between interwoven braiding strands and sufficiently strong in response to heating to contract the sleeving axially and to hold it expanded girthwise until and while being telescoped over an object to be embraced thereby.

Another object of the invention is a method of providing braided sleeving having relatively weak heat reactive warp filaments entrapped therebetween, which warp filaments readily elongate or rupture as tension is applied to the opposite ends of the sleeving after assembly about an object.

These and other more specific objects will appear upon reading the following specifications and claims and upon considering in connection therewith the attached drawing to which they relate.

Referring now to the drawing in which a preferred embodiment of the invention is illustrated:

Figure 2:
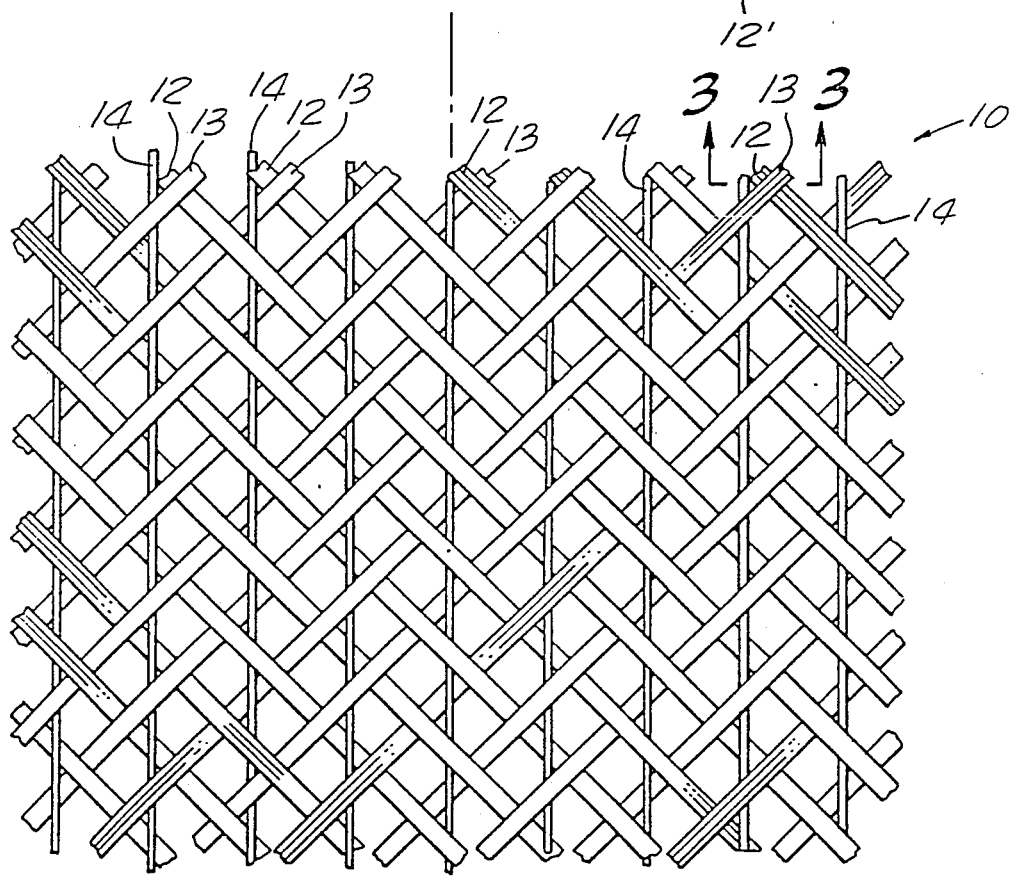
FIG. 2 is a fragmentary plan view of a magnified area of one illustrative embodiment of the sleeving showing the warp filaments trapped between adjacent strands of the braiding.

Referring initially, more particularly to FIG. 2 there is shown an illustrative embodiment of the invention sleeving formed by the customary interwoven strands 12 and 13 each formed of a plurality of flexible filaments 12', 13', (FIG. 3), in immediate proximity to each other. As herein shown, strands 12 and 13 comprise three nonconductive plastic filaments 12', 13', but, in accordance with known practice, each of the braided strands may include a lesser or substantially greater number of flexible filaments. It will be noted that FIG. 2 illustrates each of the strands 12 and 13 as passing over two adjacent strands and then under the next two strands.

Trapped between the criss crossing strands 12 and 13 are warp filaments of heat reactive plastic material having a high axial shrinkage factor such as 30% to 50%. Polyolefin plastics are well known to persons skilled in that art as having this characteristic, polyethylene being a member of this family and in widespread commercial use for its heat reactive characteristics. Filaments 14 are shown in FIG. 2 as trapped between all pairs of criss crossing strands 12 and 13. It will be understood that a substantially fewer number of warp filaments may be employed, the controlling factor being the number required to expand the braided sleeving by a substantial or desired amount girthwise. For example, if strands 12 and 13 are formed of relatively stiff filaments offering substantial resistance to expansion, then a larger number of heat reactive filaments is desirable. The warp filaments 14 have a cross section and tensile strength sufficient to expand the sleeving when heated to shrink the warp strands, but which warp filaments are readily rupturable or stretched when placed under tension to contract the sleeving into a snug fit with the object encased thereby. For example, warp strands 9 mils in diameter have been found highly satisfactory in expanding sleeving formed from 10 mil plastic strands when the sleeving is subjected briefly to a temperature of about 150° degrees F.

The sleeving, designated generally 10, is formed on a standard braiding machine well known to those skilled in the braiding art and having the required number of spools supporting a ring of studs distributed about the operating mechanism. Such machines are available with additional studs including one between each pair of the spool supporting studs. These additional studs are employed to support spools of heat reactive warp filament. The sleeving 10 shown in FIGS. 1 and 2 includes an equal number of warp filaments 14 and interbraided strands 12 and 13. However, one may employ any desired lesser number of warp filaments found to serve their function of expanding and maintaining the sleeving contracted axially and expanded circumferentially until assembled about the object to be enshrouded thereby.

Figure 1:
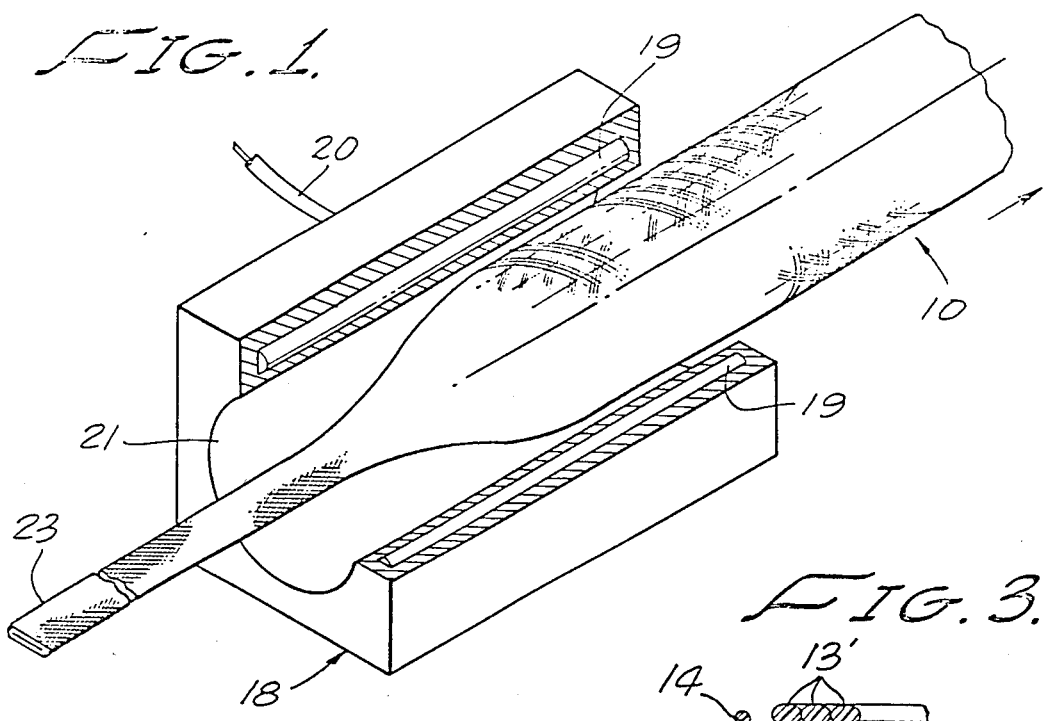
FIG. 1 is a perspective view of an illustrative embodiment of the invention sleeving while being advanced through a heating tunnel to shrink the warp filaments.

FIG. 1 shows the sleeving in the process of being advanced through a heating tunnel such as that provided by an open ended hot air oven 18. The air within the tunnel may be heated in any suitable manner as by electric heaters 19 connected to a source of electrical power via a suitable thermal regulator, not shown, by service cord 20. Oven 18 is provided with means not shown but well known in the oven heating art to maintain the temperature within oven 21 at a desired temperature to shrink the heat reactive warp strands 14.

Typically, the sleeving issuing from the braiding machine is normally substantially collapsed into a relatively narrow flat tape configuration indicated at 23 in FIG. 1. However, as it is advanced to the right, through tunnel 21 of oven 18, filaments 14 shrink approximately by 30% to 50% of their original length thereby automatically expanding the sleeving to the greatly enlarged tubular configuration shown at the exit end of the oven chamber 21. The advance end of the tubing prior to entering into the oven may be and preferably is clamped closed as by overturning the end and snugly wrapping it with several turns of pressure sensitive tape. This serves to anchor the advance end of the warp filaments 14 to safeguard against their withdrawal from the advanced end of the sleeving as shrinkage occurs.

The resulting finished product is a highly resilient tube readily, partially, or fully collapsible for packaging as by the application of light pressure transversely thereof. Immediately upon release of the pressure the sleeving resumes its former cylindrical configuration. The very substantially expanded and enlarged sleeving is readily telescoped over cabling, cordage or any elongated object of smaller cross sectional area than the pre-expanded sleeving. Once the sleeving has been telescoped over the object it can be readily and completely collapsed into a snug fit by applying tension to its opposite ends, or by first anchoring one end and applying tension to the the other end. Application of tension in either manner serves to stretch or rupture the weak warp filaments 14. This permits the helical strands to contract both axially and circumferentially against the object. The ends of the sleeving are then secured and anchored against movement in any of various known manners.

Figure 3:
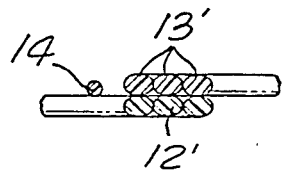
FIG. 3 is a cross sectional view on an enlarged scale taken along line 3—3 on FIG. 2.
Figure 4:
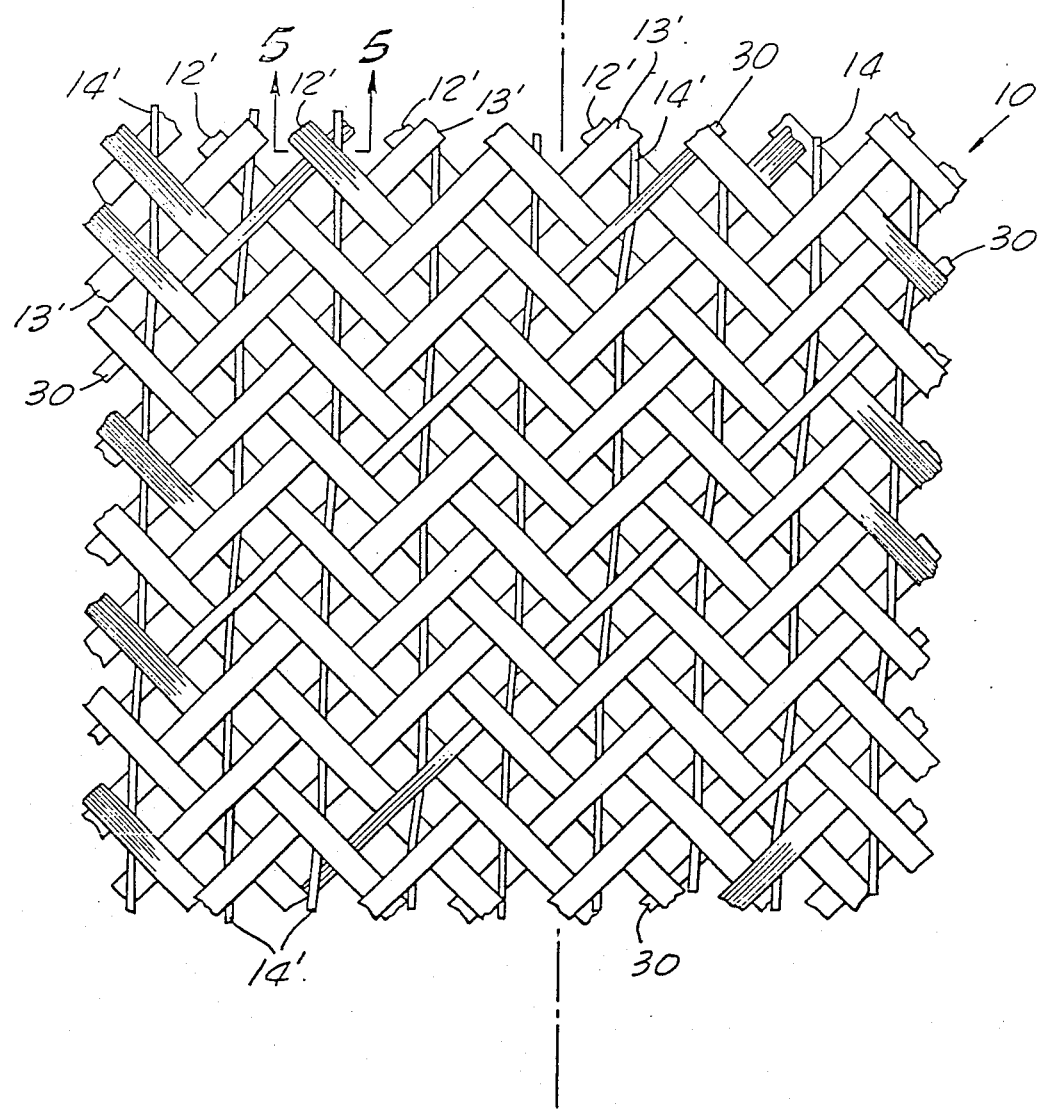
FIG. 4 is a view similar to FIG. 2 but showing an alternate species of the sleeving provided with heat reactive warp filaments and wherein every fourth strand of the braiding is formed of filaments having greater flexibility and lubricity than the braiding strands to either side thereof.
Figure 5:
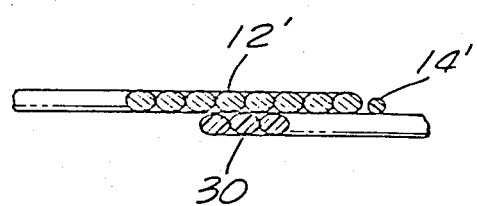
FIG. 5 is a cross sectional view taken along line 5—5 on FIG. 4.

A second species of the invention is shown in FIGS. 4 and 5 which corresponds generally with FIGS. 2 and 3 of the first embodiment. The second embodiment differs primarily in that, interspersed between certain of the braid strands 12', 13', are strands 30 formed of multiple filaments having a surface of greater lubricity than the filaments of strands 12', 13'. Typically, strands 12', 13', may be formed of relatively stiff filaments such as stiffer plastic or conductive wire. Such stiffer strands can exhibit greater resistance to slippage over one another than is desirable to provide the smooth expansion and contraction of the sleeving. It has been found that if the main body of the sleeving is formed of relatively stiff strands 12', 13' then the expansion thereof by heat reactive warp filaments is expedited and facilitated by interspersing thereamong a number of strands 30 formed for example of plastic filaments 14' of relatively greater flexibility and having a surface of greater lubricity. Expansion and contraction of such composite sleeving is thereby greatly enhanced. This improvement to a material degree is achieved if certain of these main body strands are replaced by these smoother, nonmetallic filaments of greater lubricity.

The second embodiment is produced by the same equipment and in the same manner described above for the first embodiment the only difference being that certain spools on the braiding machine contain strands of greater lubricity material 30 than the spools of material for strands 12' and 13'. Although FIG. 4 shows strands 30 spiralling in a single direction, it will be understood that a second series of strands 30 may be similarly spaced apart and inserted in the main body of the sleeving in the opposite spiral direction. As herein shown, strands 30 contain a fewer number of filaments than do strands 12', 13', but they may include the same or an even greater number of filaments than do strands 12' and 13'.

Although a heat tunnel has been shown for use in shrinking the warp filaments it will be understood that this operation can be accomplished equally effectively by passing the sleeving through hot water or by subjecting it to warm air from a heating blower.

It will be recognized from the foregoing that, if desired, girthwise expansion of the invention sleeving is readily controlled during the heat treatment of the warp filaments by shrinking them to an appropriate amount less than their maximum shrinkage capability. This is accomplished by regulating the duration and or the temperature of the shrinking operation.

In some instances it is found advantageous to avoid full shrinkage of the warp filaments 14 and 14' so that a portion of their resiliency and shrinkage capabilities remain. This retained resiliency is available for use in resisting collapse of the expanded sleeving due to handling and packaging and in restoring the sleeving to its expanded condition as soon as the collapsing pressure is released. Unless and until the expanded sleeving is placed in moderate tension, both species of the invention resist girthwise contraction due to the friction between overlapping strands of the braiding. It is therefore feasible to shrink the warp filaments until they fuse and melt with the sleeving fully expanded without sacrificing the benefits of the invention other than exercising care to avoid placing the sleeving in moderate tension until it has been assembled about the object to be protected.

Although FIGS. 1 to 4 show the heat reactive filaments 14, 14' trapped throughout the length thereof between the braided strands 12, 13 and 12', 13', they may be retained captive between these strands only at intervals along the sleeving. Either mode of entrapping the heat reactive warp filaments, or equivalents thereof, is effective to assure uniform axial contraction and circumferential expansion of the sleeving during shrinkage of filaments 14, 14' in response to brief heating thereof.

While the particular method of making pre-expanded braided sleeving herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. An improved method of processing expandable-contractable braided sleeving which comprises:

spirally interweaving multiple strands of flexible filaments into a tubular sleeve with at least one filament of resilient heat reactive material extending lengthwise of said sleeving and entrapped between at least some of said spirally interwoven strands; and heating said sleeving containing said filament of heat reactive material to a sufficient temperature to contract said sleeving axially thereof and to expand said sleeving girthwise and to retain said sleeving axially contracted and girthwise expanded, until said sleeving is placed in tension.

2. That improved method defined in claim 1 characterized in the steps of restraining one end of said sleeving from moving relative to the adjacent end of the object embraced by said sleeving, and applying a pulling force to a remote portion of said sleeving to extend the same lengthwise thereof, thereby breaking said at least one filament of heat reactive material as said sleeving contracts into a snug fit about the object embraced thereby.

3. That improved method of processing expandable-contractable sleeving defined in claim 1 characterized in the step of varying the shrinkage of said at least one heat reactive filament as necessary to expand the girth of said sleeving to a desired dimension less than that achievable by full shrinkage of said at least one heat reactive filament.

4. That improved method defined in claim 1 characterized in the step of restraining the end of said at least one filament sufficiently to prevent withdrawal of the end of the filament from the end of the sleeving as shrinkage occurs.

5. That improved method defined in claim 1 characterized in the step of storing and shipping said braided sleeving with said at least one heat reactive filament in the unshrunk condition thereof.

6. That improved method defined in claim 5 characterized in the step of subjecting said sleeving to heating to contract the same axially and expand the same girthwise at the assembly site of said sleeving to an object.

7. That improved method of processing expandable-contractable sleeving defined in claim 1 characterized in the step of captively entrapping a plurality of spaced-apart resilient heat reactive filaments lengthwise of said sleeving between said spirally interwoven strands of flexible filaments.

8. That improved method of processing expandable-contractable sleeving defined in claim 7 characterized in the step of distributing said resilient heat reactive filaments about the circumference of said sleeving.

* * * * *